No. 802,394. PATENTED OCT. 24, 1905.
H. W. HILL.
BASE PLATE FOR SHAFT BEARING STANDS AND THE LIKE.
APPLICATION FILED JULY 27, 1905.
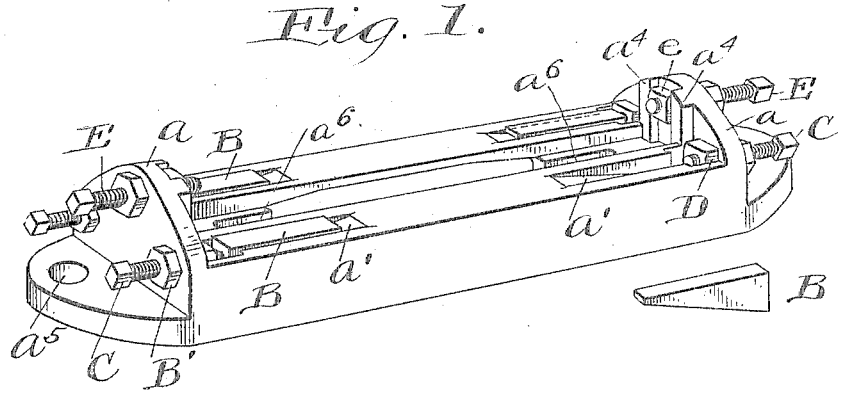
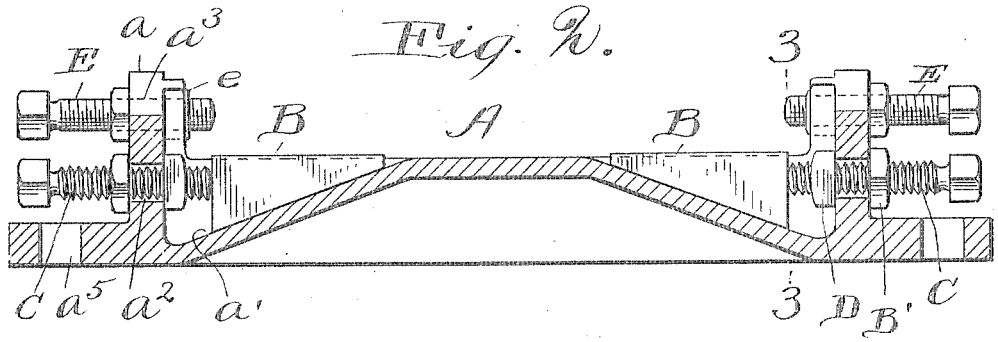
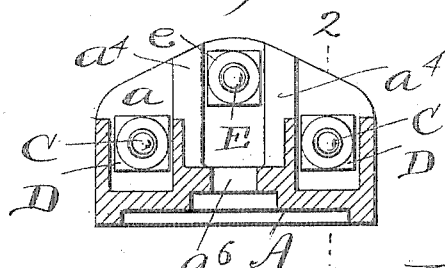
Witnesses.
E. B. Gilchrist
N. L. Brennan
Inventor.
Harry W. Hill,
By his Attorneys,
Thurston & Bates

UNITED STATES PATENT OFFICE.

HARRY W. HILL, OF CLEVELAND, OHIO.

BASE-PLATE FOR SHAFT-BEARING STANDS AND THE LIKE.

No. 802,394.  Specification of Letters Patent.  Patented Oct. 24, 1905.

Application filed July 27, 1905. Serial No. 271,428.

*To all whom it may concern:*

Be it known that I, HARRY W. HILL, residing at Cleveland, in the county of Cuyahoga and State of Ohio, have invented a certain new and useful Improvement in Base-Plates for Shaft-Bearing Stands and the Like, of which the following is a full, clear, and exact description, reference being had to the accompanying drawings.

The object of this invention is to provide a very cheap and efficient adjustable base-plate for shaft-bearing floor-stands or pillow-blocks and the like, by means of which they may be leveled and raised or lowered, so as to bring the bearings into the exact alinement required for the shaft.

The invention may be summarized as the construction and the combination of parts hereinafter described, and definitely pointed out in the claims.

In the drawings, Figure 1 is a perspective view of my improved base-plate ready for use, except that one of the wedge-blocks has been removed from the recess in which it belongs and is shown by the side of the base-plate. Fig. 2 is a sectional side elevation in the plane indicated by line 2 2 of Fig. 3, and Fig. 3 is a transverse sectional view in the plane indicated by the line 3 3 of Fig. 2.

The base-plate A is a casting of suitable dimensions which has near its ends the vertical transverse flanges $a\ a$. Just inside these flanges and close to the four corners of that part of the base which lies between these flanges are four depressions or recesses $a'$, whose bottoms incline downward toward the flanges which they are nearest to. B B indicate wedge-blocks adapted to be movably supported in these recesses. The tops of these wedge-blocks are horizontal and their bottoms are inclined to correspond with the inclination of the recess in which they are placed. In each flange $a$ are two holes $a^2$, and through each of these holes a bolt C loosely passes. Each bolt is screwed through a nut D, which lies against the inner face of the adjacent flange and between the sides of the associated recess $a'$ referred to, so that said nut cannot be turned with the bolt. A lock-nut B' is screwed onto each bolt just outside the flange $a$. The base of the shaft-bearing floor-stand or pillow-block which the described device is to support rests upon the top of these four wedge-blocks between the two flanges $a$. By driving these wedge-blocks in or allowing them to move backward the shaft-bearing stand may be raised to the proper elevation and may be leveled up to properly aline the shaft-bearing. When the wedge-blocks have been brought to the proper position to accomplish this result, they are held in that position by said bolts C. Two other bolts E pass respectively through holes $a^3$ in the two flanges $a$ and are screwed through nuts $e$, each of which lies against the inner face of the adjacent flange $a$ and between vertical ribs $a^4$ thereon, which prevent said nuts from being turned with these bolts. These bolts may be used to move the shaft-bearing stand or pillow-block toward one end or the other of said base-plate, and they may then hold it in the required position.

One great advantage of the described base-plate growing out of the described construction is the fact that the base A requires no toolwork whatever and is adapted to use just as it comes from the sand. The bolts and nuts described are of ordinary construction, and the small wedge-blocks may be cut from bar iron or steel and may be used without any additional toolwork.

The middle part of the base-plate is preferably depressed, as shown in Fig. 1, and has slots $a^6$, through which may pass bolts for securing the stands or pillow-blocks upon the described base-plate. The base-plate itself outside of the two flanges $a$ is provided with holes $a^5$, through which may pass bolts for fastening it to a suitable foundation.

Having described my invention, I claim—

1. An adjustable base-plate, consisting of a base having near its four corners four recesses with inclined bottoms, in combination with four wedge-blocks having correspondingly-inclined lower surfaces and substantially horizontal upper surfaces, which blocks are movably seated in said recesses, and means for independently holding said wedge-blocks in any required position.

2. An adjustable base-plate, consisting of a base having near its ends, two transverse flanges, and, just inside said flanges, four recesses having inclined bottoms, in combination with four wedge-blocks having correspondingly-inclined lower surfaces and substantially horizontal upper surfaces, which blocks are movably seated in said recesses, and bolts passing through said flanges for engagement with the broad ends of said wedge-blocks to hold them in the required positions.

3. An adjustable base-plate, consisting of a base having near its ends, two transverse flanges, and, just inside said flanges, four recesses having inclined bottoms, in combination with four wedge-blocks having correspondingly-inclined lower surfaces and substantially horizontal upper surfaces, which blocks are movably seated in said recesses, bolts passing loosely through holes in said flanges, nuts in said recesses and screwed upon said bolts inside said flanges, and lock-nuts screwed upon said bolts outside of said flanges.

4. An adjustable base-plate, consisting of a base having near its ends two transverse flanges, and, just inside said flanges, four recesses having inclined bottoms, in combination with four wedge-blocks having correspondingly-inclined lower surfaces and substantially horizontal upper surfaces, which blocks are movably seated in said recesses, bolts passing loosely through holes in said flanges, nuts in said recesses and screwed upon said bolts, lock-nuts screwed upon said bolts outside of said flanges, and two other bolts adjustable respectively through said flanges in a plane above the bolts first mentioned.

In testimony whereof I hereunto affix my signature in the presence of two witnesses.

HARRY W. HILL.

Witnesses:
E. B. GILCHRIST,
ALBERT H. BATES.